United States Patent
Walkup

(10) Patent No.: US 6,795,685 B2
(45) Date of Patent: Sep. 21, 2004

(54) METHOD AND APPARATUS FOR REPEATER PRIORITY RESOLUTION IN A WIRELESS COMMUNICATION SYSTEM

(75) Inventor: Kevin D. Walkup, Miramar, FL (US)

(73) Assignee: Motorola, Inc., Schaumburg, IL (US)

( * ) Notice: Subject to any disclaimer, the term of this patent is extended or adjusted under 35 U.S.C. 154(b) by 528 days.

(21) Appl. No.: 09/781,136

(22) Filed: Feb. 12, 2001

(65) Prior Publication Data

US 2002/0111137 A1 Aug. 15, 2002

(51) Int. Cl.$^7$ ............................................... H04B 7/15
(52) U.S. Cl. ....................... 455/11.1; 455/13.1; 455/22; 455/15
(58) Field of Search .......................... 455/15, 11.1, 512, 455/8, 527, 9, 518, 13.1

(56) References Cited

U.S. PATENT DOCUMENTS

| | | | | |
|---|---|---|---|---|
| 3,955,140 A | * | 5/1976 | Stephens et al. ............ | 455/11.1 |
| 4,056,779 A | * | 11/1977 | Toler .......................... | 455/11.1 |
| 4,539,706 A | * | 9/1985 | Mears et al. ................ | 455/11.1 |
| 5,915,208 A | * | 6/1999 | Collyer ...................... | 455/11.1 |
| 6,169,880 B1 | * | 1/2001 | La Fratta et al. .......... | 455/11.1 |

\* cited by examiner

Primary Examiner—Nick Corsaro
Assistant Examiner—Tan Trinh
(74) Attorney, Agent, or Firm—Barbara R. Doutre

(57) ABSTRACT

A repeater unit (202,204) operates in a multi-channel wireless communication repeater system and maintains a priority state (216) for the repeater unit (202,204). The repeater unit (202,204) includes The prioritizer module (218) further controls the repeater unit (202,204) and in response to receiving a repeater priority code (116, 118) designating itself as a non-priority repeater unit.

1 Claim, 5 Drawing Sheets

METHOD AND APPARATUS FOR REPEATER PRIORITY RESOLUTION IN A WIRELESS COMMUNICATION SYSTEM

TECHNICAL FIELD

This invention relates in general to wireless communication systems, and more particularly to determining repeater priority in a multi-channel wireless communication system.

DESCRIPTION OF THE PRIOR ART

Wireless communication systems often support repeaters distributed throughout a geographic area. Oftentimes, the geographic area is divided into coverage areas, each of which is serviced by at least one repeater in the coverage area. In certain mobile communication systems, for example, a mobile unit acts as a repeater between a portable unit in the coverage area and a remotely located base station. The mobile unit, typically based on a vehicular power source, includes a much more powerful transmitter than a portable unit that typically comprises a handheld battery operated radio. In this way, the portable unit is able to utilize the more powerful mobile unit in the coverage area to repeat communications between the portable unit and a remotely located base station.

Additionally, the wireless communication system may include multiple communication channels. A mobile repeater unit operating within the wireless communication system may move from one coverage area to another. If two or more mobile repeater units operate in a single coverage area there may opportunities for a portable unit to attempt to communicate with two mobile repeater units at the same time. Two mobile repeater units transmitting at the same time would cause interference and lost communication. To try to avoid such conflicts in communications by mobile repeater units a wireless communication system may use a priority scheme where only one mobile repeater unit in any coverage area is designated as the priority unit, while other mobile repeater units in the coverage area are designated as non-priority units. A priority unit repeating a transmission between a portable and a remote base station would be monitored by any other mobile repeater units in the coverage area and these other units would remain in a non-priority mode. In this way, normally only the one priority mobile repeater unit in a coverage area would handle repeating transmissions between a portable unit in the coverage area and a remote base station. It is essential therefore that only one mobile repeater unit were in priority mode at any one time so that two mobile repeater units will not attempt to repeat a portable-to-base or a base-to-portable transmission.

This problem is more likely to occur in communication systems where mobile repeater units communicate over multiple communication channels. Each mobile repeater unit, in such a system, typically scans channels searching for a transmission on one of its programmed frequencies. For example, if while a first mobile repeater unit is in priority mode and a second non-priority mobile repeater unit scans channels and detects a transmitted signal from a remote base station unit, for example, with no other mobile repeater unit repeating the transmission to the portable, the second mobile repeater unit may likely count itself into priority mode and begin to handle the transmission. This condition, unfortunately, would put two mobile repeater units in priority mode. During a subsequent portable-to-base transmission, for example, both priority mobile repeater units would attempt to transmit on top of each other thereby likely causing interference and lost communication.

Thus, there is a need for an improved method in a wireless communication system for multiple repeater units in a coverage area to determine priority for a single repeater unit thereby ensuring successful communication is maintained in the coverage area.

DESCRIPTION OF THE PREFERRED EMBODIMENTS

Figure 1:
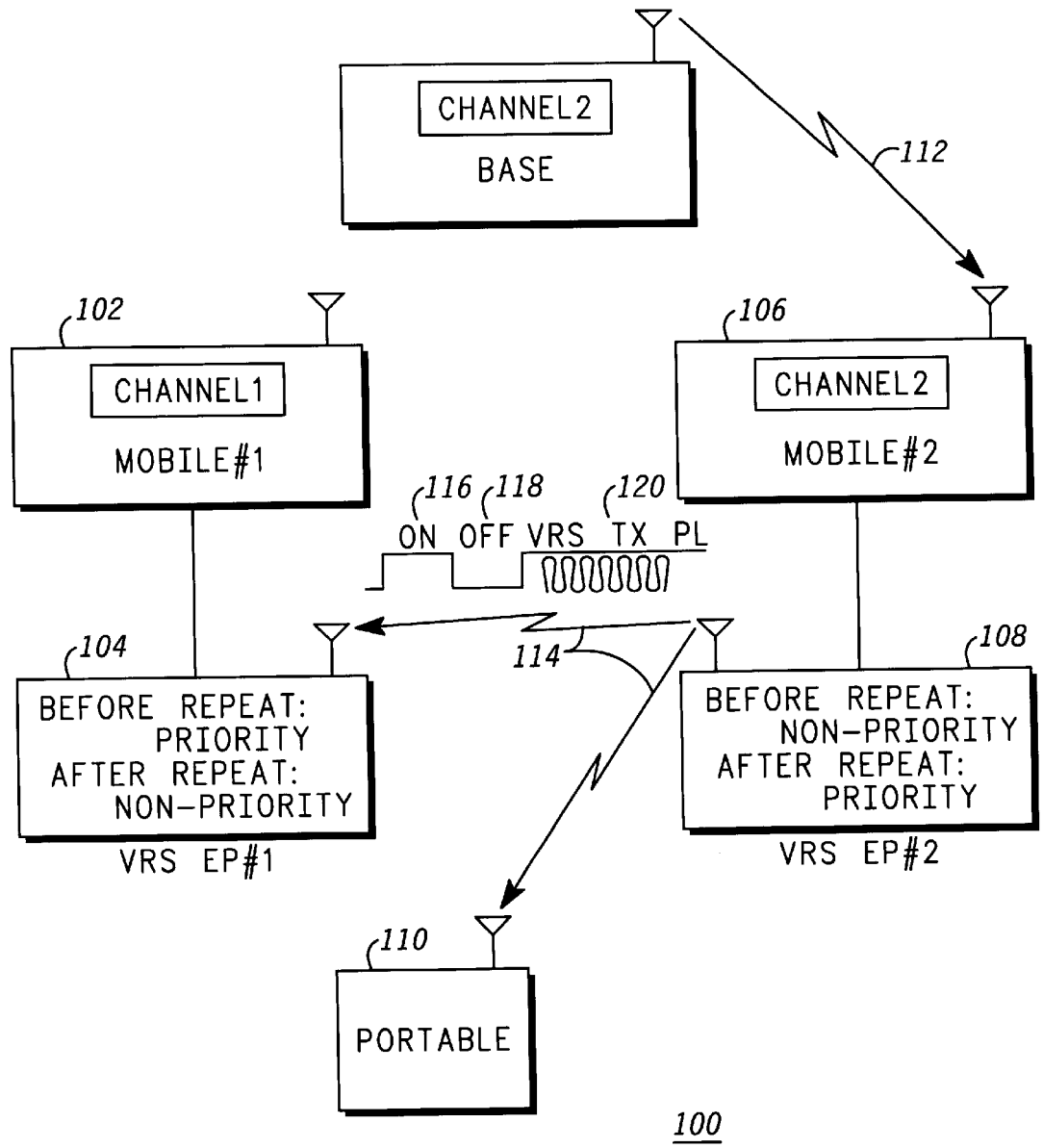
FIG. 1 is a block diagram of a wireless communication system showing multiple repeater units operating in a coverage area, in accordance with a preferred embodiment of the present invention.

This invention utilizes a new method in a wireless communication system to maintain successful repeater-based communications while avoiding transmissions from multiple repeater units in a coverage area. Generally, the wireless communication system, according to a preferred embodiment of the present invention, provides a method for maintaining prioritization of repeater units in a coverage area such that only one repeater unit will be the priority repeater unit while other repeater units will be non-priority repeater units. As will be discussed in detail below, a preferred embodiment of a repeater unit in a coverage area in a preferred wireless communication system utilizes a protocol, according to the present invention, to communicate with other repeater units in the coverage area. The protocol allows one repeater unit to be designated the priority repeater unit in the coverage area while all other repeater units in the coverage area would be designated non-priority units.

According to a preferred embodiment of the present invention, a vehicular repeater system (VRS) unit operates in a multi-channel repeater system. One particular embodiment of the general case of a vehicular repeater system repeater unit is known as a vehicular repeater system-extended protocol repeater unit. Hereafter, the term VRS repeater unit will be used to generally refer to repeater units that operate in a multi-channel repeater system according to a vehicular repeater system protocol. A VRS repeater unit provides on-site repeater capability between a portable radio and a base station. It gives the portable radio user the equivalent range of a mobile radio with the flexibility and portability of a portable radio. This combination is especially useful for government communication systems such as for use by police, fire, rescue, and other government services, where personnel travel in a mobile unit and also carry a portable unit. While personnel carry the portable unit the vehicular mobile unit can operate as a repeater unit for communications between the portable unit and a remote base station. This arrangement effectively increases the communication range for the user of the portable unit.

The VRS repeater system, according to the preferred embodiment of the present invention, comprises a portable unit that communicates with a VRS repeater unit. The VRS repeater unit communicates with a mobile radio. The mobile radio communicates with a base station.

The VRS repeater unit can communicate with multiple VRS repeater units in the same coverage area, as will be discussed in more detail below. Each of the VRS repeater units maintains a priority level in the coverage area with only one VRS repeater unit being designated the highest priority unit in the coverage area. During either portable-to-base or base-to-portable transmissions, only the highest priority VRS repeater unit in the coverage area will handle the repeated transmission. In this way, as will be discussed in detail below, two VRS repeater units will not attempt to repeat the portable-to-base or base-to-portable transmissions. The preferred embodiment of the present invention will eliminate the potential problem that a base-to-portable repeat transmission would cause two VRS repeater units to be both in the highest priority mode at the same time. It eliminates this potential problem without interfering in the normal communication of a user of a portable unit.

The VRS repeater units, according to the preferred embodiment of the present invention, utilize a VRS Transmit signal and a VRS Transmit Code to inform other VRS repeater units in a coverage area that the particular VRS repeater unit is in highest priority mode and that it is handling a repeated transmission. Preferably, when a VRS repeater unit begins a base-to-portable transmission it starts by transmitting the VRS Transmit Code immediately followed by the repeated transmission including the VRS Transmit PL signal.

The VRS Transmit Code, in this example, comprises transmitting carrier for 32 ms followed by no carrier for 32 ms. The repeater unit immediately follows this code with the repeated transmission with the VRS Transmit PL signal embedded in the transmission. The PL signal is typically a low frequency tone signal, such as around 100 Hz to about 300 Hz frequency, with a low amplitude. The PL tone signal is typically embedded in a communication to communicate with other units that are receptive to the same PL tone signal to unsquelch those other units to communicate the audio to a speaker at the unit. In this way, all radio units sharing a common PL tone signal filter will be able to listen to a radio transmission including the common PL tone signal. Those units that do not include the PL tone filter will not unsquelch and will avoid routing the transmitted audio to the local speaker at the receiving radio unit. In this way, users of radio units will typically only have to listen to audio transmissions that are from within their common group of radio units all preprogrammed to transmit with the common PL tone signal.

If a VRS repeater unit monitors a channel and receives the VRS Transmit Code followed by the VRS Transmit PL signal, then the VRS repeater unit knows that another repeater unit has counted itself into priority mode. If the particular VRS repeater unit receiving the code and the PL signal has been in priority mode, the unit forces itself to de-prioritize to a lower priority state, thereby allowing the transmitting VRS repeater unit to remain as the only VRS repeater unit in highest priority mode. Thus, multiple VRS repeater units will not be in highest priority mode at the same time possibly transmitting on top of each other and destroying communication for all.

Note that the brief VRS Transmit Code, as discussed above, will not significantly interfere with the normal communication of users of portable units that are also receiving the carrier frequency for a transmitted signal from a VRS repeater unit. Additionally, since a VRS repeater unit in a priority mode will only be receptive to the VRS Transmit Code followed by the VRS Transmit PL signal to cause the unit to de-prioritize its priority state, the VRS repeater unit will not be unintentionally de-prioritized by any portable unit that transmits using the VRS Transmit PL signal alone (i.e., without the VRS Transmit Code) to coordinate un-squelching of other portable units with the same PL tone signal filter. Therefore, a priority VRS repeater unit, according to the preferred embodiment of the present invention, maintains reliable communications in the communication system while de-prioritizing itself in response to receiving the transmission of another VRS repeater unit that has counted itself into a priority mode. This is a significant advantage of the present invention that is not available in other known prior art communication systems.

Referring to FIG. 1, a block diagram of a wireless communication system 100 is shown, in accordance with a preferred embodiment of the present invention. The system 100, as shown in FIG. 1, illustrates a coverage area including two VRS repeater units 104, 108, communicatively coupled to respective mobile units 102, 106, and the second VRS repeater unit 108 repeating a first transmission 112 from a base station to a second transmission 114 that is intended for reception by a portable unit 110. The second transmission 114 is also being monitored by the first VRS repeater unit 104. In this example, the first transmission 112 is on mobile unit channel two which only mobile unit 106 can receive since mobile unit 102, the original priority unit, is on channel one. According to the present example, each of the first mobile unit 102 and the second mobile unit 106 comprises a multi-channel transceiver that communicates across channel frequencies including channel one and channel two. However, the transceiver of the first mobile unit 102 may also scan and be able to communicate over channels that are different from channels that the transceiver of the second mobile unit 106 can scan and be able to communicate over, and vice versa. Therefore, according to the present example, there are channels that the first mobile unit 102 may communicate that are not necessarily available for communication by the second mobile unit 106, and likewise there are certain channels available for communication to the second mobile unit 106 that are not available to the first mobile unit 102. There could occur situations, therefore, when the second mobile unit 106 may monitor a transmission, such as the first transmission 112, that is not also being monitored by the first mobile unit 102.

The second transmission 114, from the second VRS repeater unit 108, includes the VRS Transmit Code, in this example, comprising transmitted carrier for 32 ms 116 followed by no carrier for 32 ms 118. The second transmission 114 immediately follows this code with the repeated transmission with the VRS Transmit PL signal 120 embedded in the transmission. Therefore, the second transmission 114 indicates that the second VRS repeater unit 108 has counted itself to highest priority status and is handling a current transmission 114 to the portable unit 110. At the same time, the first VRS repeater unit 104 is shown monitoring the second transmission 114 and thereby determining that the second VRS repeater unit 108 has counted itself to highest priority status. Accordingly, the first VRS repeater unit 104 will de-prioritize itself to non-priority status thereby allowing the second VRS repeater unit 108 to become the only repeater unit with the highest priority. This mechanism advantageously avoids two repeater units in the same coverage area being contemporaneously designated the highest priority status. Thus only one VRS repeater unit 108 remains the highest priority precluding simultaneous transmissions from both VRS repeater units 104, 108.

Figure 2:
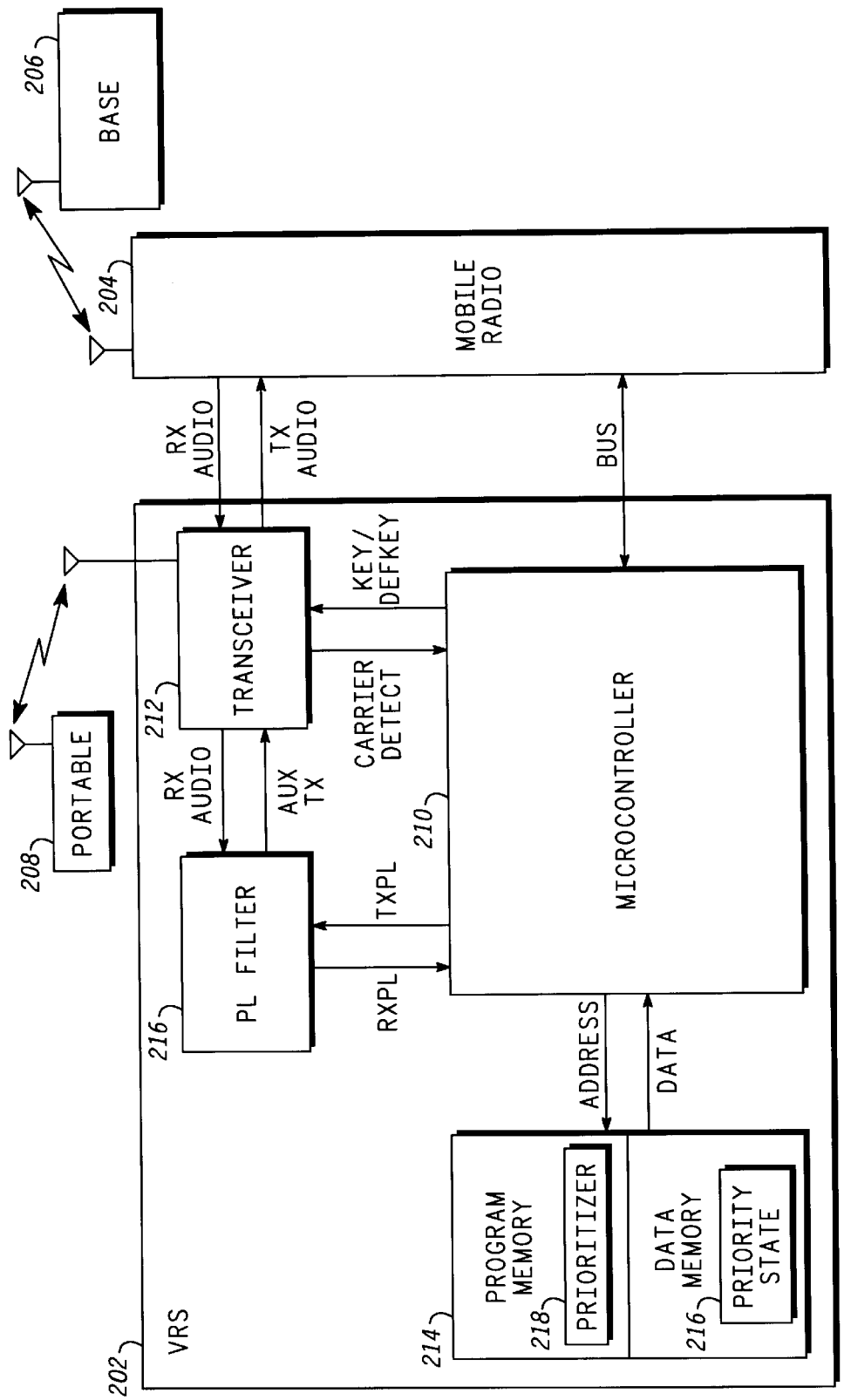
FIG. 2 is a more detailed block diagram of a repeater unit for use in the wireless communication system illustrated in FIG. 1, according to a preferred embodiment of the present invention.

Referring to FIG. 2, a more detailed view of a VRS repeater unit 202 is shown, according to a preferred embodiment of the present invention. The VRS repeater unit 202 is communicatively coupled to a mobile radio unit 204 preferably via a mobile radio interface, such as coupled via a control and data bus and via a transmit/receive audio interface in a manner well known to those skilled in the art. The VRS repeater unit 202 is shown repeating a transmission communication between a base station 206 and a portable unit 208.

The VRS repeater unit 202 comprises a radio transceiver 212 that couples the audio, via the audio interface, with the mobile radio 204. The audio received by the mobile radio 204, i.e., from the base station 206, is coupled to the transceiver 212 and then the transceiver 212 transmits the audio to the portable radio 208. The audio, on the other hand, received by the transceiver 212 from the portable radio 208 is coupled to the mobile radio 204 and then the mobile radio transmits the audio to the base station 206. In this way, the VRS repeater unit 202 and the mobile radio 204 generally operate to repeat transmissions between the portable unit 208 and the base station 206.

The VRS repeater unit 202 includes a microcontroller 210 that operates according to program instructions in a program memory. The microcontroller 210 is electrically coupled to the transceiver 212 to control the operations of the transceiver 212. Note that in a preferred embodiment, the transceiver may operate on a single channel. However, according to an alternative embodiment the transceiver 212 may operate in a multi-channel wireless communication system for communicating with portable radio units and/or with other radio units in a manner well known to those of ordinary skill in the art.

The microcontroller 210 can monitor carrier detection by the transceiver 212. This carrier detect indicates that a transmission is being received by the transceiver 212 in the channel that normally is used for communication with the portable unit 208. A key/dekey control signal from the microcontroller 210 controls whether the transceiver 212 is in a transmit mode or in a receive mode. A memory 214, in this example, includes program memory and data memory. The microcontroller 210 is electrically coupled to the memory 214 via address and data buses. The data memory contains data that is utilized in the operations of the VRS repeater unit 202. Specifically, a parameter called priority state 216 is used by the microcontroller 210 to keep track of the current priority state of the VRS repeater unit 202. Additionally, a prioritizer module 218 operates the microcontroller 210 according to the novel methods illustrated by the preferred embodiment of the present invention to determine priority status and keep track of the priority status for the VRS repeater unit 202. Lastly, a PL Filter unit 216 is electrically coupled to the microcontroller 210 and to the transceiver 212, as shown. The PL Filter unit 216 provides an RXPL signal to the microcontroller 210 to indicate when a predefined PL signal is being received by the transceiver 212. Typically, the predefined PL signal is matched to a predefined filter in the PL Filter unit 216 that detects the presence of the PL signal audio in the received audio from the transceiver 212. The microcontroller 210 provides a TX PL control signal to the PL Filter unit 216 to turn ON the PL tone signal and consequently provide the PL tone signal into the transmitted audio via the transceiver 212. In this way, the VRS repeater unit 202 can embed the PL tone signal into transmitted audio.

Figure 3:
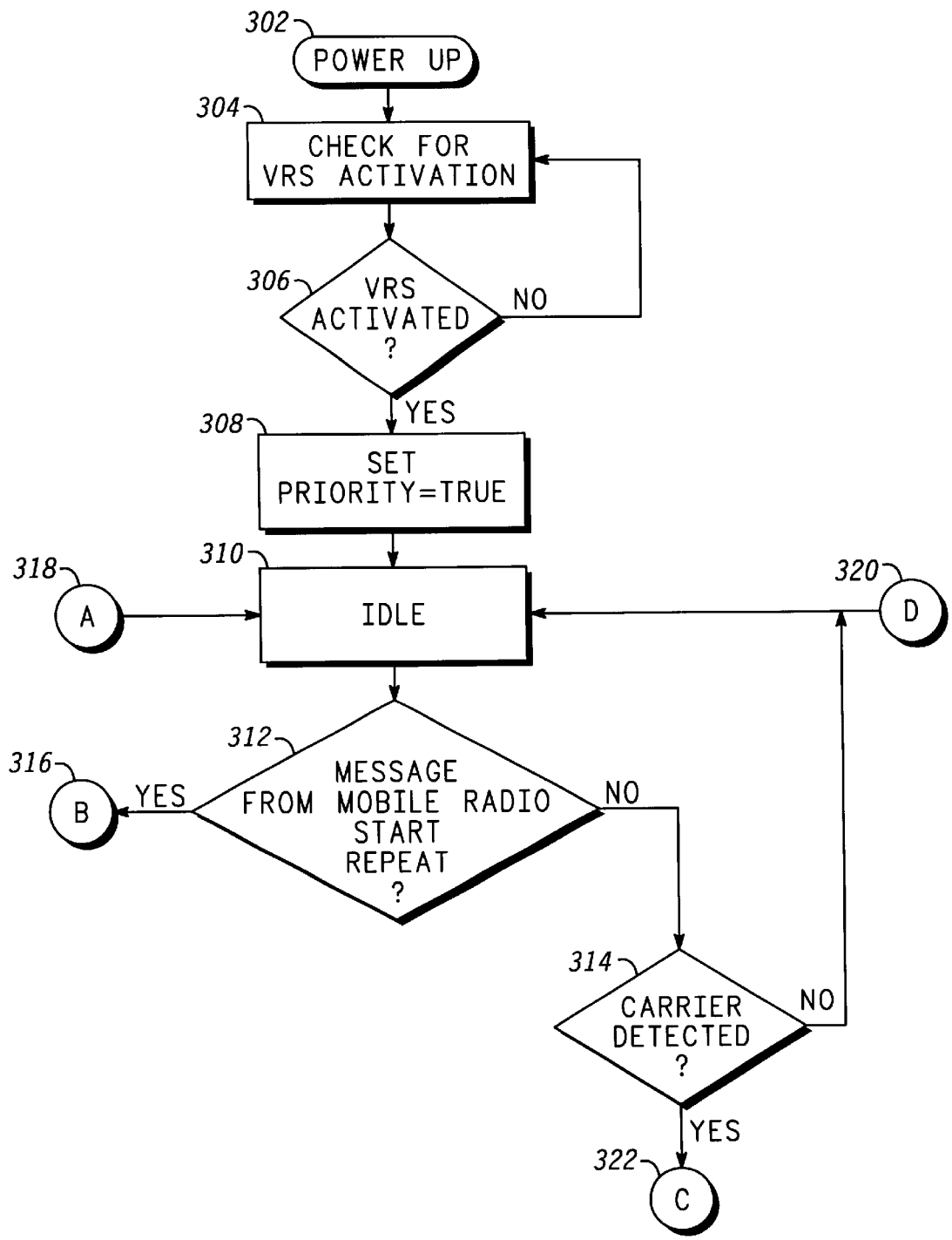
FIGS. 3, 4, and 5, comprise an operational flow diagram illustrating operational sequences for the repeater unit shown in FIG. 2 and for operating in the wireless communication system shown in FIG. 1, in accordance with a preferred embodiment of the present invention.
Figure 4:
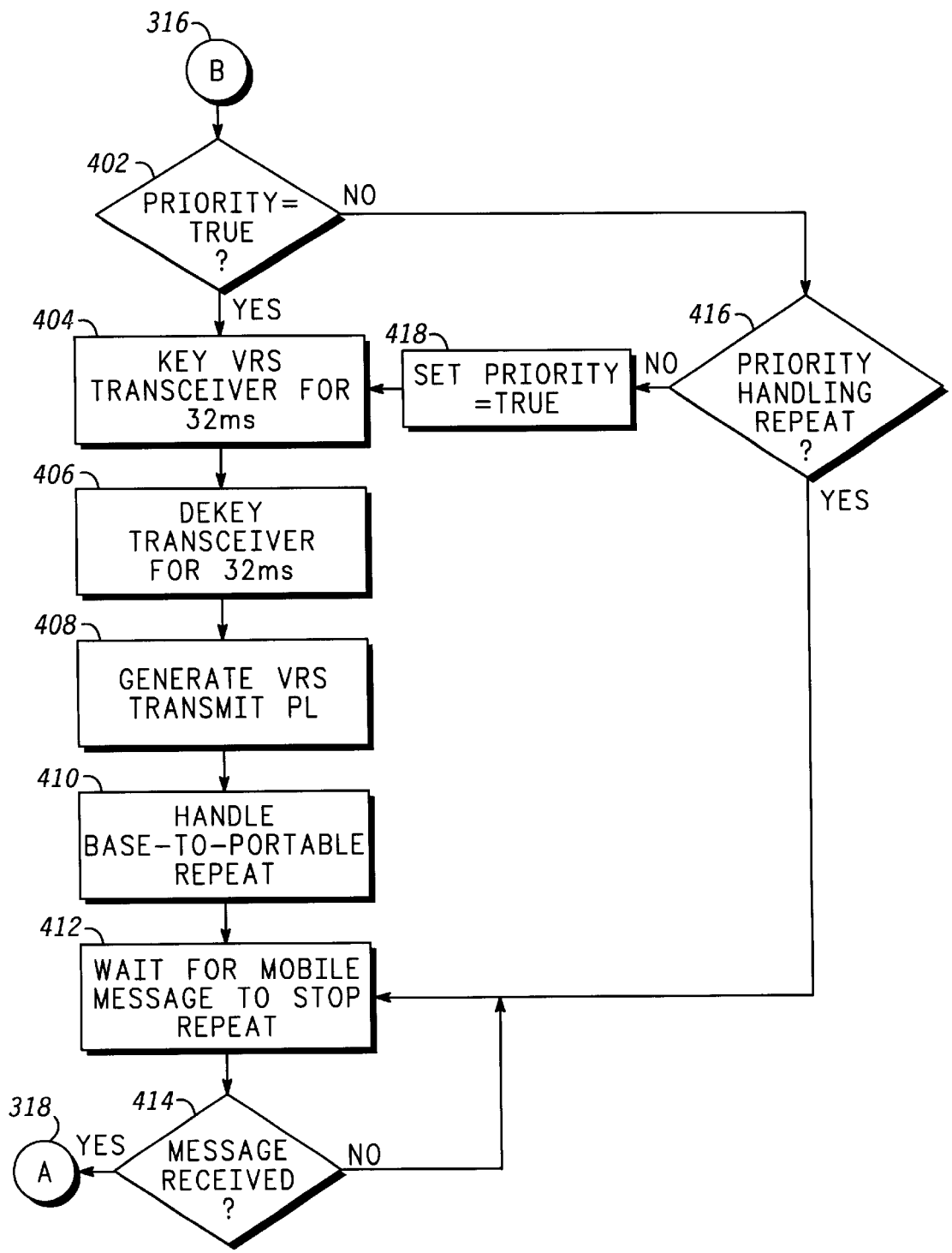
Figure 5:
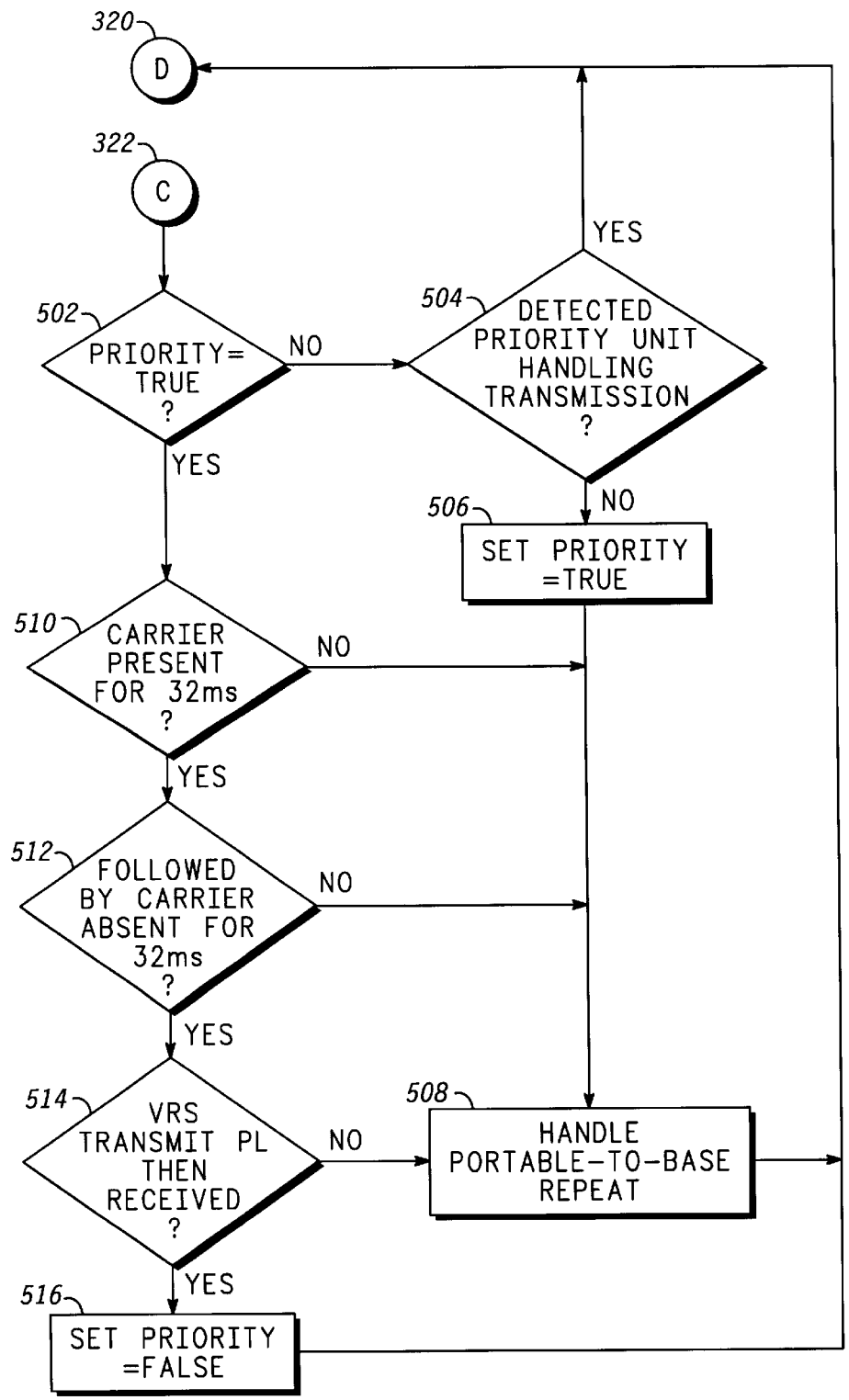

Referring now to FIGS. 3, 4, and 5, an exemplary operational sequence will be discussed for the repeater unit 202 operating in the system 100, according to a preferred embodiment of the present invention. FIG. 3 generally illustrates the initial steps in the operational sequence determining a communication mode. FIG. 4 generally illustrates a method for handling base-to-portable transmissions. FIG. 5 generally illustrates a method for handling portable-to-base transmissions.

After an initialization and power up sequence 302, the repeater unit 202 checks for vehicular repeater system (VRS) activation, at steps 304, 306. After determining that the VRS operation is activated, the repeater unit 202 sets its priority to TRUE, at step 308, and then enters an IDLE state, at step 310.

While the repeater unit 202 does not detect, at step 312, a message from the mobile radio 204 indicating to start a repeat transmission, and while no carrier is detected by the transceiver 212, at 314, the repeater unit 202 remains in IDLE mode 310. If, however, a message is received from the mobile radio 204 indicating to start a repeat transmission from base-to-portable, then the repeater unit 202 goes to operational sequence 316 for handling base-to-portable transmission. Alternatively, if the repeater unit 202 detects carrier, at step 314, then the repeater unit 202 goes to operational sequence 322 to handle portable-to-base transmission.

Referring to FIG. 4, the operational sequence for handling base-to-portable transmission will be discussed. If the priority is set to TRUE, at step 402, then the repeater unit 202 keys up the transceiver 212 to transmit the VRS Transmit Code, in this example, comprising transmitting carrier for 32 ms, at step 404, followed by no carrier for 32 ms, at step 406. The repeater unit 202 therefore transmits a repeater priority code that indicates to another repeater unit monitoring the channel that this repeater unit 202 is designated with the highest priority for handling transmissions. The repeater priority code, according to the present example, comprises the VRS Transmit Code, which in this example comprises transmitting carrier for 32 ms followed by no carrier for 32 ms. Then, the repeater unit 202 turns ON the PL tone signal generator 216, at step 408, and the transceiver 212 transmits the PL Tone audio signal along with handling the base-to-portable repeat transmission, at step 410. This transmission continues until instructed by the mobile radio 204 to stop transmitting, at step 412 and step 414. In such a case, the repeater unit 202 returns to IDLE mode 310. Additionally, note that if the repeater unit 202 enters the operational sequence of FIG. 4 with priority set to FALSE, at step 402, the repeater unit 202 then determines whether another priority unit is handling the repeat by monitoring the carrier detection signal from transceiver 212, at step 416. If the repeater unit 202 detects that a priority unit is handling the transmission at step 416 it does not handle the base-to-portable transmission and waits for a message from the mobile radio 204 at step 412 indicating it is no longer receiving a transmission. However, if the repeater unit 202 does not detect that a priority unit is handling the transmission at step 416, then it sets its priority to highest priority, at step 418, and then goes to start the signaling to seize the priority status from all repeaters in the coverage area, at steps 404, 406, 408, and then to handle the base-to-portable repeat transmission, at steps 410, 412.

Referring to FIG. 5, the operational sequence 322 for handling portable-to-base transmission will be discussed. If the priority is not set to TRUE, at step 502, then the repeater unit 202 waits for a message from mobile radio 204 indicating that there is another repeater unit with highest priority handling transmissions. If the repeater unit 202, at step 504, detects another high priority repeater unit 202 then this repeater unit 202 returns 320 to IDLE mode 310.

Alternatively, if the repeater unit 202, at step 502, determines that it is the highest priority repeater unit 202 then it goes to check whether a repeater priority code is being received from the communication channel. This repeater priority code indicates that another repeater unit is designated with the highest priority for handling transmissions. The repeater priority code, according to the present example, comprises the VRS Transmit Code, which in this example comprises transmitting carrier for 32 ms followed by no carrier for 32 ms. Therefore, the repeater unit 202 checks whether the VRS Transmit Code, in this example, comprising transmitted carrier for 32 ms, at step 510, followed by no carrier for 32 ms, at step 512, is present in the channel. Further, it checks whether the transmission immediately following the VRS Transmit Code includes the VRS Transmit PL signal 120, at step 514. If all these conditions are met, then the priority is set to FALSE, at step 516, and the repeater unit 202 returns 320 to IDLE mode 310. However, if any of these conditions are not met, then the repeater unit 202 goes to handle the portable-to-base repeat transmission, at step 508, and then when done returns 310 to IDLE mode 320.

The present invention offers significant advantages over the prior art. For example, by avoiding the transmissions of multiple repeaters in the same coverage area the preferred embodiment provides more reliable delivery of communication and avoids interference and loss of communication. This results in a perception of higher quality and improved performance for a wireless communication system 100 incorporating the present invention. This in turn enhances the commercial viability of such a system 100.

Although specific embodiments of the invention have been disclosed, it will be understood by those having ordinary skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A vehicular repeater system (VRS), comprising:
   a portable radio;
   a base station;
   a VRS repeater unit provided by a vehicular mobile radio, the VRS repeater unit providing repeater capability beween the portable radio and the base station, the VRS repeater unit in communication with the portable radio using a VRS transmit PL signal; and
   wherein the VRS repeater unit transmits a VRS transmit signal and a VRS transmit code to establish priority amongst other VRS repeater units within a coverage area, the transmit code being transmitted on carrier for 32ms followed by no carrier for 32ms and then followed by a repeated transmission having the VRS transmit PL signal embedded therein.

* * * * *